3,268,698
ELECTRICAL APPARATUS COMPRISING SULFUR HEXAFLUORIDE AND ORGANIC INSULATION WITH ANHYDROUS CALCIUM SULFATE
Edward S. Bober, Churchill, and Herbert A. Burgman, Pittsburgh, Pa., assignors to Westinghouse Electric Corporation, East Pittsburgh, Pa., a corporation of Pennsylvania
Filed Aug. 12, 1963, Ser. No. 301,505
5 Claims. (Cl. 200—144)

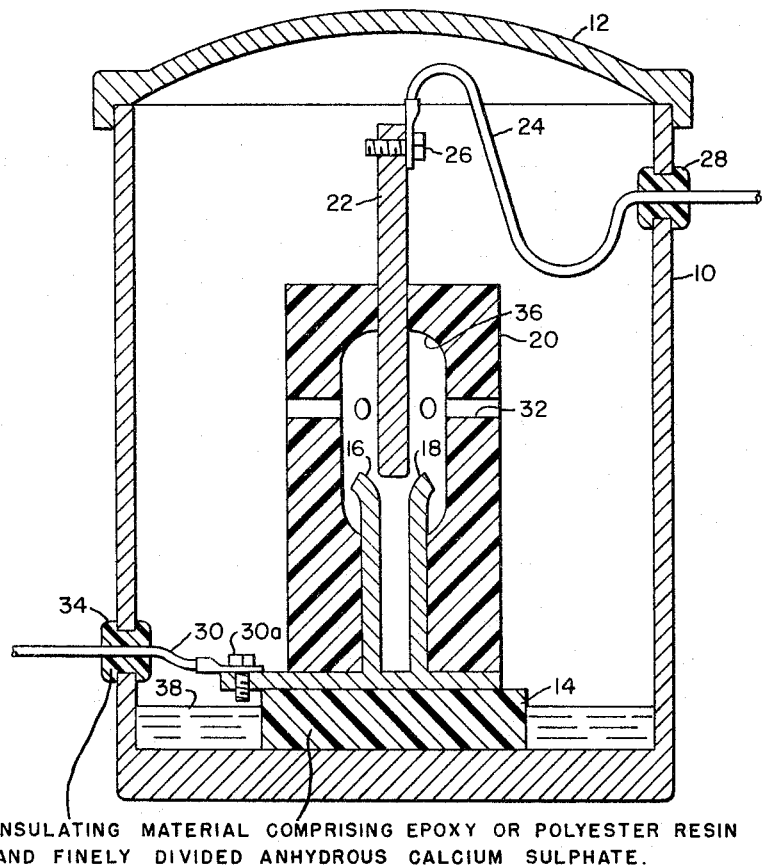
INSULATING MATERIAL COMPRISING EPOXY OR POLYESTER RESIN
AND FINELY DIVIDED ANHYDROUS CALCIUM SULPHATE.

This invention relates to organic insulation to be used with electrical equipment and in particular concerns the minimization of arc and tracking as well as chemical degradation of organic insulation used with current conductors in electrical apparatus.

In certain types of electrical apparatus, such as load break switches, circuit breakers and circuit reclosers, a dielectric that has found wide use is sulfur hexafluoride ($SF_6$), used both as a gas and as a liquid, the latter under pressure. The decomposition products of sulfur hexafluoride may be damaging to some insulation. Accordingly, although insulation has performed satisfactorily heretofore in the presence of the hexafluoride, it is desirable to further increase the resistance of insulation used in conjunction therewith to provide an even greater measure of safety in operation of such electrical equipment.

It is therefore a primary object of the present invention to provide electrical apparatus comprising electrical conducting members and insulation, which insulation comprises organic insulating material and anhydrous calcium sulfate, whereby greater resistance to arc and tracking and resistance to chemical attack is provided.

Other objects of the invention will be apparent from the following detailed description, and the attached drawing in which the single figure shows, partly in section and partly in elevation, a view of electrical equipment that can serve as a switch, circuit breaker or the like and contains insulation in accordance with the present invention.

In accordance with our discoveries, the objects are achieved and insulation, as well as electrical apparatus including such insulation and spaced conductors between which a potential may exist, is provided that is particularly resistant to arc and tracking by including anhydrous calcium sulfate in the organic insulating material. The anhydrous calcium sulfate is thoroughly incorporated in the organic insulating material during the forming thereof and thus is uniformly distributed throughout the insulation when associated with electrical conductors. Consequently, this desirable improved property is imparted to these organic insulating materials and the electrical apparatus with which they are associated without departing from the techniques presently utilized in these parts.

As just noted, the material we incorporate in organic insulation to render it arc and tracking resistant and resistant to chemical attack, is anhydrous calcium sulfate ($CaSO_4$). This material can be obtained commercially in the anhydrous form and can be used as such. Where it is commercially obtained in a hydrated form, it can be lightly calcined or otherwise treated to remove moisture. In order to achieve the indicated results and simultaneously to provide insulation that includes it without departing from the usual practices in this art, the anhydrous calcium sulfate is used in finely divided form, that is in a size that passes a 100 mesh (Tyler) screen and suitably all of a size of minus 325 mesh. Preferably, the particles used are relatively uniform and can, if desired, be ground or milled. In any event, the particles are incorporated in the organic insulation material in the usual fashion for the particular organic insulation involved; for example, they are blended in epoxy type insulation while it is in a state sufficiently fluid to permit stirring so that the sulfate is distributed relatively uniformly throughout. Generally, the anhydrous calcium sulfate is used in an amount, by weight, of about 9 to 65 percent, and preferably 25 to 60 percent, based on the resulting insulation with the exact amount being determined to give the best results with the particular material with which it is used.

The organic insulating materials used in the present invention are presently used in the electrical industry for laminating, potting, casting and molding practices with such equipment as circuit breakers, transformers and the like. Typical of these are epoxy resins and polyester resins, which comprise on the order of 35 to 91 percent, and preferably about 40 to 75 percent, of the resulting insulation of this invention. The epoxy resins are, as is apparent to the artisan, polyether derivatives of a polyhydric organic compound, for example polyhydric alcohols containing at least two phenolic hydroxy groups per molecule, and the resulting epoxy resins generally have more than 1 epoxy group per molecule, for example 1.5 to 3 epoxy groups per molecule. These polymeric epoxides may, for example, be prepared by reacting from 1 to 10 mole portions of an epihalohydrin, preferably epichlorohydrin, with about 1 mole proportion of Bisphenol A in the presence of a stoichiometric excess of alkali based on the amount of halogen present. The mixture is heated to a temperature within the range of about 80° to 110° C. for a period of time varying from about ½ to 3 hours or more, depending upon the quantities of reactants used. The resulting polymer may then be washed with hot water to remove unreacted alkali and halogen salts. Residual moisture may be removed by heating in a vacuum at about 100° C. for a short period. However prepared, we prefer to use the epoxy resins of moderate average molecular weight, e.g. below about 450, of which Epon 828 (Shell) is a representative example, and especially the liquid aromatic base resins. Other general procedures for making epoxy resins are well known in the patent literature as well as in such standard texts as Epoxy Resins by Skeist, Reinhold Publishing Company (1958) and Epoxy Resins by Lee et al., McGraw-Hill (1957) to which reference may be made.

The polyester resinous materials can also be used in the invention. The polyester resin compounds can be formed by the reaction of 0.5 to 2 parts of a polyhydric alcohol and one part of a polybasic acid, at least part of which is unsaturated. It is usual to employ maleic acid or anhydride, or fumaric acid as the source of unsaturation, and ethylene glycol, propylene glycol or the like as the polyhydric alcohol. This reaction product (a polyester) is copolymerized with about 0.1 to 1 part, based on the polyester, of a vinyl compound such as vinyl acetate, methyl methacrylate, styrene or the like, usually in the presence of a small amount, such as 0.01 to 1 percent, of a catalyst such as a peroxy catalyst, e.g. tertiary butyl hydroperoxide or benzoyl peroxide or methyl ethyl ketone peroxide, at about room temperature.

Unsaturated chlorinated polyester resins, known as the Hetron resins (Hooker Chemical Corporation), are also satisfactory. Briefly these are the reaction products of (Het Anhydride) 1,4,5,6,7,7-hexachlorobicyclo-(2,2,1)-5-heptene-2,3-dicarboxylic anhydride (or acid) and a polyfunctional alcohol such, for example, as diethylene glycol or propylene glycol. Detailed methods of preparing such polyester resins are available in United States Patents 2,779,700 and 2,931,746 to which reference can be made.

Other suitable resins are the flexible polyester resins prepared by reaction of one or more dicarboxylic acids or anhydrides such, for example, as phthalic anhydride, maleic anhydride, adipic anhydride or other anhydride containing up to about 15 or more carbon atoms per molecule, and a polyfunctional alcohol, such for example, as ethylene glycol, diethylene glycol, propyleneglycol and the like. Procedures for preparation for these and other polyesters are well known, and can be found in the patent art as well as in such texts as Polymers and Resins by Golding (1959), D. Van Nostrand Company.

In addition to the anhydrous calcium sulfate and the epoxy or polyester resin or combination of those resins, compositions of the invention may include catalysts, activators, promotors, accelerators and the like to convert the resin to an infusible mass. Such materials as the conventional organic peroxides, such as methyl ethyl ketone peroxide and benzoyl peroxide, and anhydrides such, for example, as Het anhydride, methyl nadic anhydride, maleic anhydride and phthalic anhydride can be used to cure the epoxy resins. For example, upon using an anhydride curing agent, an epoxy composition can be readily cured by heating to a temperature of about 150° C. for several hours, for example 2 to 6 hours or more. Polyester materials are readily cured at room temperature with methyl ethyl ketone peroxide and a promoter and accelerator such as lauryl mercaptan and cobalt naphthenate. Elevated temperature curve of polyester resins can be accomplished, if desired, at about 150° C. with benzoyl peroxide or tertiary butyl hydroperoxide. The details of the cure are available in the technical literature of the manufacturer. In general, however, accelerators are used in amounts ranging from about 0.01 to about 2 percent based on the resin, while anhydride curing agents are used in about 0.5 to 1 part per part of resin used.

Application of the invention is evident in the attached drawing. Referring now to the drawing, there is shown a vessel 10 having a cap member 12 thereon adapted to pressure seal the vessel. Within the vessel 10 is a base member 14 that supports the electrical structure in it. The electrical structure shown has a pair of contact jaws 16 and 18 that are attached to the upper surface of the base member 14. The upper portions of the jaws 16 and 18 are supportingly embedded in a Teflon insulation 20. Movably mounted above the contact jaws 16 and 18 in the open position is a conducting member 22 that is slidably received through an aperture in the upper end of the insulation member 20. A first power lead 24 is attached to the electrical sliding member 22 as by the conducting bolt 26 on its upper end. Electrical lead 24, which is of a length to permit free movement of member 22, passes outwardly through the sidewall of vessel 10 through a sealed bushing member 28 and then to a power source (not shown). A second electrical power line 30 is connected to the end of resilient jaw members 16 and 18 by bolts 30a. As with the first electrical conductor 24, conductor 30 is passed through the sidewalls of the vessel 10 through sealed bushing member 34 and then to power sources that are not shown. Within the vessel 10 surrounding the electrical unit therein is the sulfur hexafluoride dielectric 38. Ports 32 admit the sulfur hexafluoride gas into the chamber 36 in which arcing between member 22 and the jaws 16–18 occurs and causes decomposition of the sulfur hexafluoride which products diffuse into the main vessel 10 and reach bushings 28 and 34. As shown, a pool 38 of the dielectric in the liquid state lies at the bottom of the vessel; a few atmospheres of gas pressure is sufficient to maintain the dielectric in the liquid state. Bushings 28 and 34, as well as base member 14, are made of the compositions of this invention.

The apparatus shown is to be used in high power circuits and accordingly, when contact is broken between the electrically conducting member 22 and the spring jaws 16 and 18, (by movement by mechanism not shown), an arc will develop. The gaseous sulfur hexafluoride dielectric aids in suppressing that arc. To prevent destruction of the insulation comprising bushings 28 and 34, and base member 14 that might result upon repeated arcing and tracking along its surface, this insulation is made in accordance with the present invention. Thus it contains from 9 to 65 percent of anhydrous calcium sulfate in epoxy or polyester resin that imparts arc and tracking resistance to the insulation and aids in preventing its chemical destruction since the decomposition products due to arcing of the sulfur hexafluoride tend to react with it.

The invention will be described further in conjunction with the following specific examples. A standard test procedure was applied as follows: Compositions were cast into 1¾ inch diameter cylinders from which ¼ inch thick wafers were cut. These samples were then tested under arced $SF_6$ in special equipment that consisted of a closed pressure vessel 6 inches in diameter and 12 inches long that contained a tubular shield in which power arcs could be drawn without direct radiation on the test samples. On the upper portion of the test chamber, bushings were located that served as mounts for the samples and through which leads were taken to the resistance measuring instruments. Two concentric ring electrodes were placed on each surface of the specimens. The inner electrode was one inch O.D. and the outer electrode was 1½ inches I.D. and the leads were connected so that the surface resistance of the annular space could be measured. The specimens with electrodes in place were fastened in the tank on the bushings and then conditioned under vacuum (28–29 inches Hg) at 60° C. for 6 hours. The test chamber was cooled to room temperature, returned to atmospheric pressure and then filled one-third full with liquid $SF_6$. The unit was sealed and then heated to 60° C. Arcs were then drawn in the tubular shield. Approximately twenty 5,000 ampere arcs, each lasting 3 to 5 half cycles, were drawn during the exposure of most of the samples. Data were taken as follows: The insulating resistance of the area between the electrodes was measured at room temperature on the samples in the as-received condition. It was again measured at elevated temperatures (40° to 57° C.) after they were conditioned and at elevated temperatures (50° to 66° C.) periodically during the series of test arc shots or after it or both.

In a first example of the invention, 21.8 parts of a liquid epoxy resin prepared upon reaction of Bisphenol A and epichlorohydrin, having an epoxide equivalent weight of about 190 to 210, a viscosity at 73° F. of 10,000 to 20,000 centipoises and a hydroxyl equivalent weight of 85 (Epon 828, Shell Chemical), 1.09 parts of antimony trioxide, 21.2 parts of Het anhydride, 48.1 parts of anhydrous calcium sulfate, and 8.9 parts of castor oil maleate were admixed and cast to test structures as described. These test structures were then tested for surface resistance as produced at 40° C. before test, and after 20 test shots of arcs having an arc energy of 225.1 kw.s. (kilowatt seconds). In every instance, the surface resistance exceeded 10,000 megohms.

In another example 20.8 parts of an epoxy resin prepared upon reaction of Bisphenol A and epichlorohydrin, having an epoxide equivalent weight of about 190 to 210, a viscosity at 73° F. of 10,000 to 20,000 centipoises and a hydroxyl equivalent weight of 85 (Epon 828), 3.13 parts of a flexible polyester resin having a viscosity of 10 poises at 77° F., a specific gravity of 1.05 at 77° F., and APHA color of 150 max. and an acid number of 8 (Plaskon 9600, Allied Chemical), 1.20 parts of antimony trioxide, 21.2 parts of Het anhydride, 45 parts of anhydrous calcium sulfate, and 8.75 parts of castor oil maleate were admixed and cast to test structures as before. These structures were then tested for surface resistance as produced, at 40° C. before test, after 20 test shots of arcs having an arc energy of 225.1 kw.s., after 20 test shots at an energy of 548.5 kw.s. and after 30 test shots at 354.9 kw.s. In every instance, the surface resistance exceeded 10,000 megohms.

In this example of the invention, 62.8 parts by weight of an unsaturated chlorinated polyester resin (Hetron 92, Hooker Chemical), 3.12 parts of antimony trioxide, 31.4 parts of anhydrous calcium sulfate, 0.63 part of methyl ethyl ketone peroxide, 0.19 part of lauryl mercaptan and 1.86 parts of styrene were mixed thoroughly. The resulting mixture was then cast to sample discs and tested for surface resistance as before. The tests were made on the discs as received, after 30 test shots of 354.9 kw.s., after 30 test shots of 548.5 kw.s. and at room temperature (25° C.) after all tests. In every instance, the surface resistance exceeded 10,000 megohms.

In this example, 41.5 parts of a self-extinguishing polyester resin having a Gardner-Holdt viscosity of Z-Z1 and a specific gravity of 1.26 (Laminac 4146, American Cyanamid), 46.5 parts of anhydrous calcium sulfate, 4.56 parts of antimony trioxide, 0.44 part of benzoyl peroxide and 7 parts of a filler (Dacron staple, Du Pont) were used to make test discs. These discs were subjected to 7 shots of the high energy (93 kw.s.) arc shots. In all tests of surface resistance, before as well as after the test, values exceeding 10,000 megohms were obtained.

In two other examples, approximately 19 parts of Epon 828, 22.9 parts of dimethyl substituted butenyl tetrahydrophthalic anhydride (Beta S, Heydon-Newport) and about 58 parts of calcium sulfate were combined. In a first of these 0.19 part of dimethyl phthalate was used. Otherwise, the only distinction between the two test samples was the manufacturer of the anhydrous calcium sulfate. In the as-received condition, at 58° C. before test, and after 7 test shots of 93 kw.s., both formulations showed satisfactory surface resistance that exceeded 10,000 megohms in every instance but one. That instance was the high temperature (58° C.) measurement of the resistance of the first sample after the test shots. That value was 4,000 megohms, which is satisfactory.

A test breaker operating at 34.5 kilovolts generally similar to that shown in the drawing was constructed with the bushings 28 and 34 cast of a mixture of 20.8 parts of an epoxy resin (Epon 828), 3.13 parts of a polyester resin (Plaskon 9600) and 8.75 parts of castor oil maleate, and 45 parts of anhydrous calcium sulfate, with 21.2 parts of Het anhydride as a coreactive catalyst. The breaker was repeatedly tested at 5000 amperes such that up to 548 kilowatt seconds of power were dissipated per arc interruption, with sulfur hexafluoride atmosphere at a pressure of 45 to 60 p.s.i.g. in the casing. Substantial amounts of fluoride decomposition products were produced. Completely satisfactory bushing insulation performance was realized in all these tests. The surface dielectric strength was maintained at a very high level at all times.

Materials such as polytetrafluoroethylene cannot be used for the lead in bushings because of their physical limitations. The polyester and epoxy resin materials filled with anhydrous calcium sulfate performed outstandingly from physical, electrical and chemical standpoints. It will be appreciated that the polyester and/or epoxy resin anhydrous calcium sulfate compositions can be combined with a few fibrous reinforcing materials such as polyethylene terephthalate fibers in mat or staple fiber in amounts of up to 50 percent of each. Base member 14 may be a laminate of Dacron mat or cloth and the resin compositions. Silica, silicates, carbonates, hydrated aluminum and similar fluoride sensitive materials should not be incorporated in the compositions for use in practicing the invention.

While anhydrous calcium sulfate is commercially available, the hydrated calcium sulfate is employed as a filler in resinous compositions. Actually, calcium sulfate in either form, is not commonly used as a filler in resins and rarely, if ever, in the high proportions disclosed here, and particularly it is not employed as the sole filler in resinous compositions.

In the electrical apparatus the sulfur hexafluoride can be at atmospheric pressure or admixed with other gases, but preferably it is at an elevated pressure up to ten atmospheres or more.

From the foregoing discussion and data, it is evident that our invention constitutes a highly effective solution to the potential problem of insulation deterioration from chemical attack, arcing and tracking in sulfur hexafluoride-containing electrical equipment. Consequently improved laminates for use as electrical insulation, improved potted electrical equipment and conductors and equipment containing molded insulation are provided in consequence of this discovery.

Unless otherwise indicated or apparent, all percentages and parts are given by weight.

While the invention has been disclosed with reference to particular embodiments, it will be understood that modifications, changes and substitutions may be made without departing from its scope.

We claim:

1. Sealed electrical apparatus containing sulfur hexafluoride as a dielectric and including spaced electrically conductive members in contact therewith, between which members an electrical arc normally will result and affect the sulfur hexafluoride to cause decomposition thereof and an organic insulating material adjacent to and providing at least a part of the electrical insulation for the electrically conductive members and being in contact with the sulfur hexafluoride, the organic insulating material comprising a composition consisting of about 9 to 65 weight percent, of the insulating material, of fine particles of anhydrous calcium sulfate as the sole inorganic filler and the balance of the insulating material being at least one resin selected from the group consisting of epoxy and polyester resins, the anhydrous calcium sulfate particles being distributed throughout the resin, whereby the organic insulating material maintains a high surface resistivity in the presence of the arc decomposed sulfur hexafluoride.

2. The sealed electrical apparatus of claim 1 wherein the anhydrous calcium sulfate comprises from 25% to 60% by weight of the organic insulating material.

3. Apparatus in accordance with claim 2 in which the balance of said organic insulating material consists (1) of an admixture of up to 50 percent of the weight of the insulating material of organic fibrous fillers not sensitive to decomposition products of sulfur hexafluoride and (2) at least one resin selected from the group consisting of epoxy and polyester resins.

4. Apparatus in accordance with claim 3 in which said organic fibrous fillers comprise fibers of polyethylene terephthalate.

5. The sealed electrical apparatus of claim 2 wherein the sulfur hexafluoride therein is under a pressure of up to 10 atmospheres to function as a dielectric surrounding the electrically conductive members.

References Cited by the Examiner

UNITED STATES PATENTS 2,961,518  11/1960  Hermann _____ 200—144
3,166,656  1/1965   Hollmann et al. _____ 200—120

FOREIGN PATENTS 20,483  1902  Great Britain.

ROBERT K. SCHAEFER, *Primary Examiner.*

ROBERT S. MACON, *Examiner.*